Patented July 26, 1932

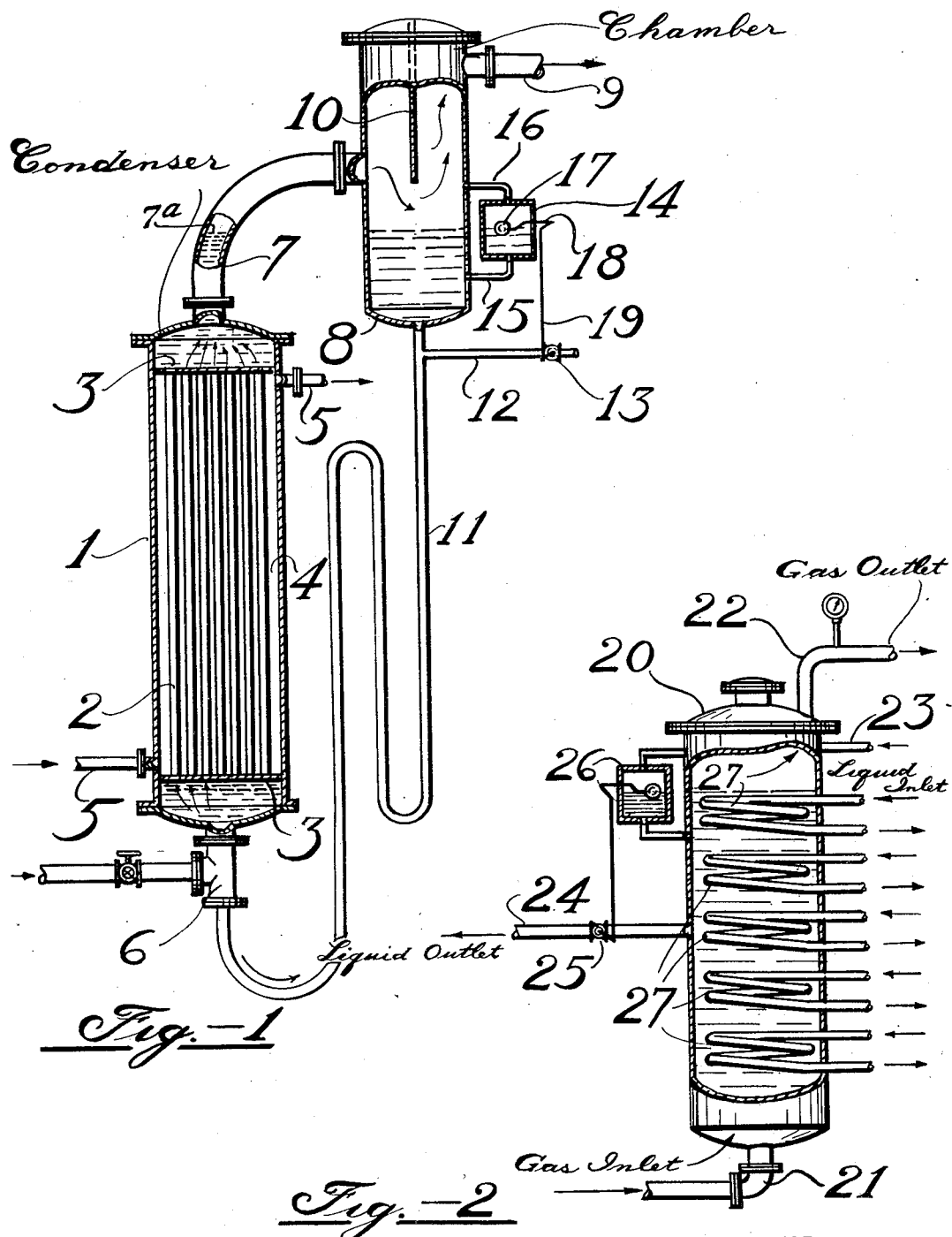

1,869,340

UNITED STATES PATENT OFFICE

MATTHEW D. MANN, JR., OF ROSELLE, NEW JERSEY, ASSIGNOR TO STANDARD OIL DEVELOPMENT COMPANY, A CORPORATION OF DELAWARE

METHOD AND APPARATUS FOR HEAT TRANSFER

Application filed December 17, 1929. Serial No. 414,621.

This invention relates to the exchange of heat between a gas or vapor and a liquid and has for an object to provide an improved method of and apparatus for cooling the gas or vapor, with or without condensation, by direct contact with a liquid and indirect heat exchange between that liquid and a fluid heat-transfer medium, preferably another liquid.

Other objects will be apparent from the specification and from the accompanying drawing, in which latter Fig. 1 is a diagrammatic representation in longitudinal section of a preferred embodiment of the invention; and Fig. 2 is a similar view of an alternative form.

Referring particularly to Fig. 1 of the drawing, the device comprises a condenser receptacle 1 which contains a tube assembly. The tube assembly comprises a plurality of tubes 2 which are supported by the headers 3. The tubes extend substantially vertically within the receptacle and communicate at opposite ends with the interior of the receptacle. The casing and headers form a chamber 4 through which cooling fluid is adapted to be circulated to and from conduits 5. A pipe 6 communicates with the bottom of the receptacle and is adapted to conduct gas from a source of supply (not shown) into the receptacle. A line 7 connects the upper portion of the receptacle with a chamber 8. A pipe 9 leads from the chamber, and is adapted to conduct gas therefrom to a suitable place of discharge. A baffle plate 10 is disposed within the chamber and extends between the line 7 and the pipe 9. A line 11 connects the bottom of chamber 8 with the pipe 6. Line 11 is of a generally S shape and forms a trap which constitutes a liquid seal between the lower portion of the condenser 1 and chamber 8.

Discharge pipe 12 communicates with the line 11 and is provided with a valve 13. Means are provided for controlling the level of the liquid in the chamber 8. This means comprises a container 14 which has fluid communication through pipes 15 and 16 with the chamber 8 below and above the normal level of the liquid in it. A float 17 in the container 14 is adapted to actuate the valve 13 through members 18 and 19.

In one method of operating the equipment, cooling fluid such as brine is passed through the chamber 4 of the condenser. Gas, containing condensible material, is passed through pipe 6 into the receptacle where it passes through the interior of the tubes 2 and any higher boiling components in the gas are condensed. The condensate accumulates in the receptacle, thereby filling it to a level above the upper ends of the tubes. The gas passing through the condenser bubbles through the liquid condensate and intimately mixes with it to effect direct heat transfer between the gas and liquid with removal of the condensible material from the gas. The passage of the gas effects circulation of the condensate through the tubes and thereby brings fresh portions of the condensate into contact with the walls of the tubes. The gas passes from the condenser into the chamber 8 where it follows a tortuous path and passes from the chamber to a suitable place of disposal (not shown). Some liquid passes into the chamber 8 with the gas.

In passing through the chamber 8, any particles of liquid mechanically entrained in the gas are removed therefrom and accumulate in the bottom of the chamber. This liquid is returned to the condenser through the line 11, and excess condensate is withdrawn from the system through the line 12. If desired, liquid such as oil or water, can be introduced into the condenser prior to the initial passage of gas through the condenser. When the device is utilized for the treatment of gas which contains no condensible material, additional liquid can be introduced into the condenser to replace any liquid lost by mechanical entrainment with the gas.

One advantageous use of the method is in the condensation of gasoline constituents from natural gas or petroleum refinery gas. Brine at about 0° F. is passed around the tubes 2. Refinery gas from a compressor is passed into the bottom of the receptacle 1, whence it flows through tubes 2 for discharge at 9. The receptacle and tubes are soon filled with condensed gasoline constituents. A heat transfer rate of 40–60 B. t. u. per square foot per Fahrenheit degree is thus obtained. Even higher efficiencies, as compared with prior methods, are obtained when dry gases are cooled. Provision of liquid in the tubes, as described herein, gives the advantage of a high heat transfer rate due to liquid to liquid heat exchange.

In the form of the invention shown in Fig. 2, a drum or tower 20 has a gas inlet 21 and gas outlet 22. Liquid for heat transfer may be supplied through a line 23 or may be allowed to accumulate in the drum through condensation. Heat transfer liquid is discharged through a line 24 which is preferably controlled by a valve 25 actuated by a float valve mechanism 26. A temperature controlling fluid, usually a liquid such as oil or water, is passed through coils 27 arranged at various levels in the drum. As in the device of Fig. 1, gas is forced through the body of liquid in the drum under conditions to cause the gas to intimately commingle with it through a long path in contact with the heat conductive walls of the coils 27.

While the invention has been described as applied to the condensing of volatile material from gas, it will be understood that it is applicable for any purposes involving heat transfer between a gas or vapor and a liquid in which the gas or vapor is subjected to direct contact with the liquid, and the liquid is in turn subjected to indirect heat transfer. In the claims, the word "gas" is intended to mean gas, vapor, or mixtures of gas and vapor.

The invention is not limited to the specific details given by way of illustration and various changes may be made within the scope of the appended claims.

I claim:

1. The method of effecting heat transfer which comprises bubbling gas through liquid of a different temperature than the gas and disposed in a plurality of communicating columns whereby circulation of the liquid is effected, and returning the liquid to substantially its initial temperature.

2. The method of cooling gas, which comprises bubbling the gas through a plurality of communicating columns of relatively cool liquid, and cooling the liquid.

3. The method of cooling gas, which comprises bubbling the gas through a plurality of communicating columns of relatively cool liquid, cooling the liquid, and returning liquid entrained in the gas to the main body of liquid.

4. The method of cooling gas, which comprises bubbling gas through a plurality of columns of relatively cool liquid, cooling the liquid, and adding additional liquid to the columns of liquid.

5. The method of condensing higher boiling components from gas containing the same, which comprises passing the gas through a cooling zone, whereby condensate is formed, accumulating the condensate in a plurality of columns in said cooling zone, and bubbling additional gas containing condensible material through the condensate.

6. The method of condensing higher boiling components from gas which comprises passing the gas through a cooling zone whereby condensate is formed, accumulating the condensate in a plurality of columns in said cooling zone, maintaining the level of condensate in the columns, and bubbling fresh gas containing condensible material through the condensate.

7. The method of condensing higher boiling components from gas containing the same, which comprises bubbling the gas through a plurality of communicating columns of relatively cool liquid, whereby condensate is obtained from the gas, and cooling the liquid by indirect heat exchange.

8. The method of condensing volatile material from gas, which comprises bubbling the gas through relatively cool liquid disposed in communicating columns whereby circulation of the liquid is effected, cooling the liquid, and returning any liquid entrained in the gas to the columns.

9. The method of increasing the heat transfer rate between a gas and a temperature controlling liquid separated by heat-conductive walls from the gas, which comprises causing a heat transfer liquid to accumulate in a plurality of communicating columns in the path of the gas, whereby liquid to liquid heat exchange relations are established, and forcing the gas through the heat transfer liquid under conditions to cause the gas to intimately commingle with it in contact with the heat-conductive walls.

10. Heat transfer apparatus comprising a conduit adapted to contain a body of liquid in communicating columns, means for passing gas through the body of liquid, means for removing mechanically entrained liquid from the thus treated gas, and means for returning the removed liquid to the main body of liquid.

11. Heat transfer apparatus comprising a conduit adapted to contain a body of liquid in communicating columns, means for passing gas through the body of liquid, means for removing mechanically entrained liquid from the thus treated gas, means for returning the removed liquid to the main body of liquid, a discharge conduit, and means for automatically controlling the level of liquid in the system.

MATTHEW D. MANN, Jr.